US011779962B2

(12) United States Patent
Imrali

(10) Patent No.: US 11,779,962 B2
(45) Date of Patent: Oct. 10, 2023

(54) SLIDE CLEANER

(71) Applicant: Ahmet Imrali, Ilford (GB)

(72) Inventor: Ahmet Imrali, Ilford (GB)

(*) Notice: Subject to any disclaimer, the term of this patent is extended or adjusted under 35 U.S.C. 154(b) by 960 days.

(21) Appl. No.: 16/610,865

(22) PCT Filed: May 3, 2018

(86) PCT No.: PCT/GB2018/051184
§ 371 (c)(1),
(2) Date: Nov. 4, 2019

(87) PCT Pub. No.: WO2018/203066
PCT Pub. Date: Nov. 8, 2018

(65) Prior Publication Data
US 2021/0001343 A1 Jan. 7, 2021

(30) Foreign Application Priority Data
May 4, 2017 (GB) .................... 1707087

(51) Int. Cl.
B01L 9/00 (2006.01)
B08B 11/04 (2006.01)
B08B 3/04 (2006.01)
G01N 21/15 (2006.01)

(52) U.S. Cl.
CPC ........ B08B 3/04 (2013.01); B01L 9/52 (2013.01); B01L 13/02 (2019.08); B08B 11/04 (2013.01); G01N 21/15 (2013.01); B01L 2200/026 (2013.01); B01L 2200/04 (2013.01); B01L 2300/04 (2013.01); B01L 2300/0822 (2013.01)

(58) Field of Classification Search
None
See application file for complete search history.

(56) References Cited

U.S. PATENT DOCUMENTS

| 5,485,861 A | 1/1996 | Hiratsuka et al. |
| 5,842,491 A | 12/1998 | Han et al. |
| 2004/0029258 A1* | 2/2004 | Heaney ............. B01L 9/527 |
| | | 435/287.2 |

(Continued)

FOREIGN PATENT DOCUMENTS

| CN | 103769399 A | 5/2014 |
| CN | 104094122 B | 3/2017 |

(Continued)

OTHER PUBLICATIONS

PCT International Search Report & Written Opinion dated Jul. 31, 2018, International Application No. PCT/GB2018/051184.

(Continued)

Primary Examiner — Brian R Gordon
(74) Attorney, Agent, or Firm — GATES & COOPER LLP

(57) ABSTRACT

The invention is a slide cleaner apparatus. The apparatus includes a cleaning chamber configured to receive a cell counting slide, at least one fluid inlet arranged to align with an inlet on a cell counting slide when located in the chamber, and configured to feed cleaning fluid into the cleaning chamber and slide, and at least one fluid outlet configured to remove cleaning fluid from the cleaning chamber and slide. The invention also includes methods of cleaning a cell counting slide.

19 Claims, 9 Drawing Sheets

(56) References Cited

U.S. PATENT DOCUMENTS

| | | | |
|---|---|---|---|
| 2004/0037739 A1* | 2/2004 | McNeely | B01L 3/5085 |
| | | | 422/417 |
| 2005/0042768 A1* | 2/2005 | Fredrick | B82Y 30/00 |
| | | | 422/560 |
| 2005/0214854 A1* | 9/2005 | Dahm | B01L 3/502 |
| | | | 435/287.2 |
| 2006/0166371 A1* | 7/2006 | Testa | G01N 1/31 |
| | | | 436/174 |
| 2007/0091287 A1 | 4/2007 | Chang et al. | |
| 2008/0047590 A1 | 2/2008 | Weill et al. | |
| 2009/0103064 A1 | 4/2009 | Yoda | |
| 2012/0230886 A1* | 9/2012 | Henry | B01L 3/5027 |
| | | | 422/502 |
| 2016/0107159 A1* | 4/2016 | Gong | B01L 3/567 |
| | | | 435/6.12 |
| 2016/0339427 A1* | 11/2016 | Wiktor | B01J 19/0046 |
| 2021/0172968 A1* | 6/2021 | Gaertner | B01L 3/5027 |

FOREIGN PATENT DOCUMENTS

| | | |
|---|---|---|
| CN | 105431603 B | 10/2017 |
| WO | 2017011243 | 1/2017 |

OTHER PUBLICATIONS

UK Search Report dated Oct. 19, 2017, Application No. GB 1707087.1.

\* cited by examiner

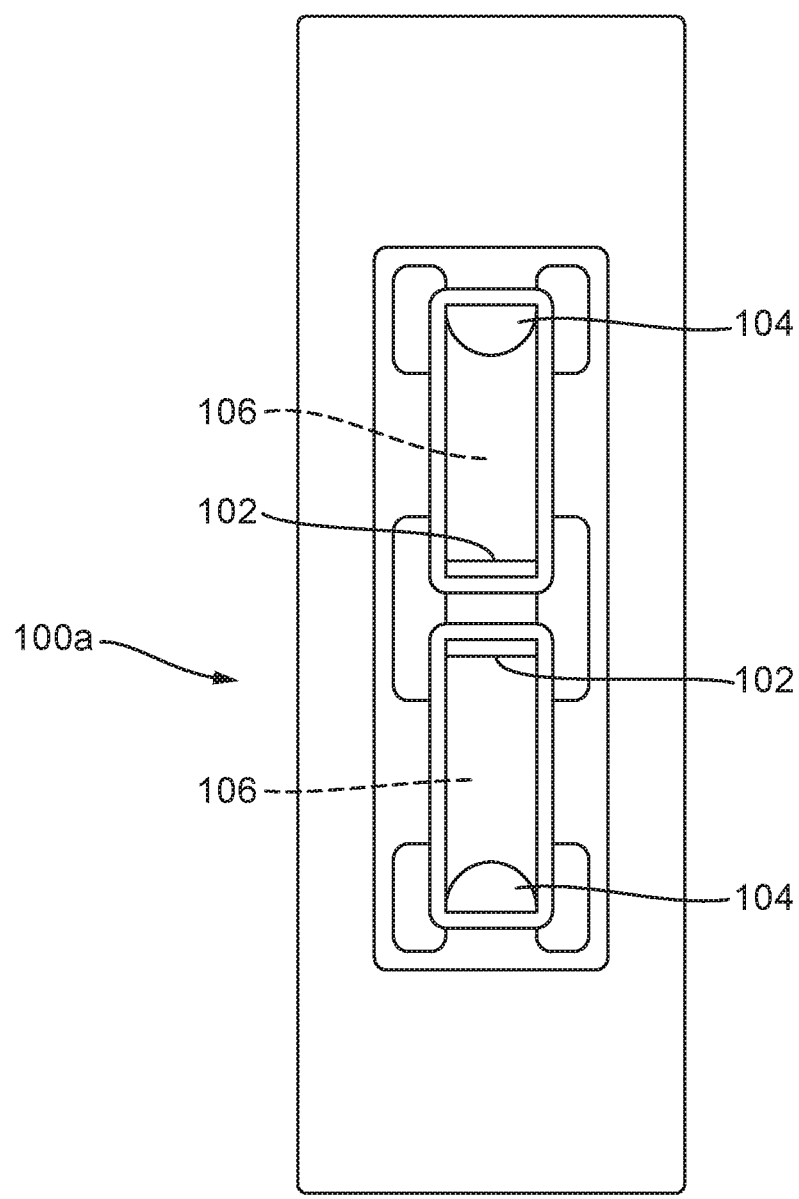

SLIDE CLEANER

This application is a national stage application, filed under 35 U.S.C. § 371, of International Patent Application No. PCT/GB2018/051184, filed on May 3, 2018, which claims priority under Section 119(e) from GB Application Serial No. 1707087.1, filed May 4, 2017, entitled "SLIDE CLEANER" by Ahmet Imrali, the contents of all of which are incorporated herein by reference.

The invention relates to slide cleaners, and in particular to a slide cleaner for cleaning a slide for use in a cell counter. The invention also extends to a method of cleaning a cell counting slide.

Cell counters are machines which automatically count cells in a culture. Generally, trypan blue is combined with cells and then loaded into a disposable cell counting chamber slide. The slide may then be inserted into a cell counter which counts the cells quickly and reliably. Since slides are disposable there is no risk of cross contamination. However, the cost of disposable cell counting chamber slides can be prohibitive, and due to their disposable nature, use of the slides results in a significant amount of solid biohazard waste material. Accordingly, manufacturers of some cell counters have begun to offer reusable slides. However, the reusable slides are significantly more expensive to purchase than the disposable slides, and since they generally comprise a glass material are prone to break. Furthermore, the slides need to be cleaned and dried manually, this can take a significant amount of time and can risk the person cleaning the slides being exposed to a biological hazard. Additionally, there is a risk of contamination due to the slides not having been cleaned properly between uses.

The present invention arose due to the inventor trying to overcome the problems associated with the prior art.

In accordance with a first aspect of the invention, there is provided a slide cleaner apparatus comprising a cleaning chamber configured to receive a cell counting slide, at least one fluid inlet arranged to substantially align with an inlet on a cell counting slide when located in the chamber, and configured to feed cleaning fluid into the cleaning chamber and slide, and at least one fluid outlet configured to remove cleaning fluid from the cleaning chamber and slide.

Advantageously, in use, cleaning fluid is fed from the inlet into the chamber such that it enters the slide, dislodging cells and other contaminants, and then flows through the outlet, thereby cleaning the slide.

The cleaning chamber may define a maximum length of between 50 mm and 200 mm, more preferably between 60 mm and 150 mm or between 70 mm and 100 mm and most preferably between 75 mm and 80 mm. The cleaning chamber may be configured to define a maximum width of between 10 mm and 100 mm, more preferably between 15 mm and 50 mm or between 20 mm and 40 mm, and most preferably between 25 mm and 30 mm. The cleaning chamber may be configured to define a depth of between 1 mm and 20 mm, more preferably between 1.2 mm and 10 mm, between 1.3 mm and 5 mm, between 1.4 mm and 4 mm or between 1.5 mm and 3 mm, and most preferably between 1.65 mm and 2 mm. In a most preferred embodiment, the depth of the chamber is 1.8 mm. Preferably, the depth of the chamber substantially the same across its width and length.

The cleaning chamber may be configured to receive a Countess® cell counter slide or a Luna® cell counter slide. Accordingly, the cleaning chamber may be substantially cuboid and define a base and four walls. Alternatively, the cleaning chamber may be configured to receive a Bio-Rad TC20® cell counter slide.

Preferably, the chamber is configured to receive a Countess® cell counter slide.

Preferably, the at least one fluid inlet is disposed in the base of the chamber. Preferably, the or each inlet defines a maximum width of between 1 mm and 20 mm, more preferably between 2 mm and 15 mm or between 3 mm and 10 mm, and most preferably between 4 mm and 8 mm. In a preferred embodiment, the or each inlet defines a width of about 6 mm. Preferably, the inlet defines a maximum length of between 0.5 mm and 10 mm, more preferably between 1 mm and 7.5 mm or between 1.5 mm and 5 mm, and most preferably between 2 mm and 3 mm. Preferably, the or each inlet defines a substantially semi-circular shape.

Preferably, the or each inlet comprises a fluid injector, configured to feed cleaning fluid into the cleaning chamber and slide. Preferably, the injector extends between 0.01 mm and 3 mm above the base of the chamber, more preferably between 0.1 mm and 2 mm above the base of the chamber, and most preferably between 0.25 mm and 1 mm above the base of the chamber.

Preferably, the apparatus comprises two inlets. Preferably, each inlet is arranged to substantially align with an inlet on a cell counting slide when located on the chamber. Advantageously, the inlets discharge fluid into cell chambers in the slide.

Preferably, the or each outlet is arranged to substantially align with an outlet on the cell counting slide. Preferably, the at least one fluid outlet is disposed in the base of the chamber. Preferably, the or each outlet defines a maximum width of between 1 mm and 20 mm, more preferably between 2 mm and 15 mm or between 3 mm and 10 mm, and most preferably between 4 mm and 8 mm. In a preferred embodiment, the or each outlet defines a width of about 6 mm. Preferably, the or each outlet defines a maximum length of between 0.25 mm and 10 mm, more preferably between 0.5 mm and 7.5 mm or between 0.75 mm and 5 mm, and most preferably between 1 mm and 2 mm. Preferably, the or each outlet defines a substantially rectangular shape.

Preferably, the apparatus comprises two outlets. Preferably, each outlet is arranged to substantially align with an outlet on a cell counting slide when located on the chamber. Advantageously, the outlet removes fluid from the cell chambers in the slide.

Preferably, the two outlets are disposed substantially between the two inlets.

Preferably, the base of the chamber comprises silicon, more preferably a silicon lining. In one embodiment, the silicon lining has a Shore A hardness of between 10 and 40 at 20° C., more preferably between 20 and 30 at 20° C., and most preferably about 27 at 20° C. In an alternative embodiment, the silicon lining has a Shore A hardness of between 5 and 40 at 20° C., more preferably between 7.5 and 30 at 20° C., and most preferably between 10 and 20 at 20° C. Accordingly, the Shore A hardness may be about 15 at 20° C. Advantageously, in use, the silicon lining enables a seal to be created around a slide ensuring that there is no leakage of the cleaning fluid.

Preferably, the slide cleaner comprises a cover configured to removably cover the cleaning chamber (and a slide when present). In a preferred embodiment, the cover is pivotably attached to the slide cleaner, such that the cover moves between a closed configuration in which it covers the cleaning chamber (and slide when present), and an open configuration in which it allows access to the cleaning chamber (and slide when present).

Preferably, the apparatus comprises locking means configured to lock the cover in the closed configuration. In one embodiment, locking means comprises a stud comprising a magnetic metal disposed on the cover and a locking point comprising an electromagnet disposed at least adjacent to the stud when the cover is in the closed configuration, or vice versa. The electromagnet may be activated when the cover is in the closed configuration, thereby locking the cover.

However, in the preferred embodiment, the locking means comprises a stud disposed on the cover and a further stud disposed on a locking point, wherein the studs are disposed substantially adjacent to each other when the cover is in the closed configuration. One of the studs may comprise a metallic metal and the other stud may comprise a magnet. However, in a preferred embodiment, both of the studs comprise a magnet, preferably a neodymium magnet. Advantageously, when the cover is closed, the cover is retained in the closed configuration due to magnetic attraction.

Preferably, each stud has a maximum width of between 1 mm and 50 mm, more preferably between 2.5 mm and 35 mm, and most preferably between 5 mm and 15 mm. Preferably, each stud has a maximum length of between 1 mm and 50 mm, more preferably between 2.5 mm and 35 mm, and most preferably between 5 mm and 15 mm. Preferably, each stud has a maximum depth of between 1 mm and 50 mm, more preferably between 2.5 mm and 35 mm, and most preferably between 5 mm and 15 mm.

Preferably, the cover comprises at least one projection, which, when the cover is in the closed configuration, is arranged to substantially align with the inlet on the cell counting slide when located in the chamber. Preferably, the cover comprises at least one projection, which, when the cover is in the closed configuration, is arranged to substantially align with the outlet on the cell counting slide when located in the chamber. Preferably, the or each projection is disposed on an underside of the cover, such that when the cover is in the closed configuration the or each projection contacts a slide when present. In a preferred embodiment the cover comprises three projections. For example, one projection aligns with the two outlets, one projection aligns with a first inlet, and another projection aligns with a second inlet. Advantageously, the one or more projections push down and hold the slide securely in the cleaning chamber when the cover is in the closed configuration.

Preferably, the apparatus comprises a bumper configured to prevent the cover from slamming when closed. Preferably, the bumper comprises a piston, preferably a slow moving piston. The piston may comprise a rubber coating. Preferably, the bumper is disposed substantially adjacent to the chamber.

Preferably, the slide cleaner comprises a cleaning fluid reservoir configured to store cleaning fluid therein, and a cleaning fluid conduit extending between the cleaning fluid reservoir and the at least one fluid inlet, and configured to transport cleaning fluid from the cleaning fluid store to the or each inlet.

Preferably, the apparatus comprises a cleaning fluid pump configured to pump cleaning fluid from the cleaning fluid reservoir, along the cleaning fluid conduit to the or each inlet. Preferably, the pump is configured to pump the cleaning fluid from the cleaning fluid reservoir, along the cleaning fluid conduit to the or each injector. Preferably, the pump is a peristaltic pump.

Preferably, the cleaning fluid comprises a liquid. Preferably, the cleaning fluid comprises water, and more preferably deionised water. In one embodiment, the cleaning fluid comprises an alcohol. Accordingly, the cleaning fluid may comprise between 1% and 50% (v/v) alcohol, preferably between 5% and 40% (v/v) alcohol, more preferably between 10% and 30% (v/v) alcohol, and most preferably about 20% (v/v) alcohol. The alcohol may comprise ethanol, propanol and/or isopropanol. Preferably, the cleaning fluid comprises a surfactant. The surfactant may comprise sodium dodecyl sulphate (SDS). The cleaning fluid may comprise between 0.01 and 20 wt % surfactant, preferably between 0.1 and 10 wt % surfactant, and more preferably between 0.5 and 5 wt % surfactant.

In a preferred embodiment, the surfactant is provided in the form of a dishwashing liquid. In a most preferred embodiment, the cleaning fluid comprises deionised water and about 1 wt % dishwashing liquid.

Cleaning fluid may include low concentrations of an effective preservative to prevent the contamination and growth of microorganisms during the usage. The preservative may comprise sodium azide ($NaN_3$). The cleaning fluid may comprise between 0.001 and 5 wt % preservative, preferably between 0.01 and 1 wt % preservative, and more preferably between 0.05 and 0.5 wt % preservative.

Preferably, the slide cleaner comprises a waste fluid reservoir configured to store waste fluid therein, and a waste fluid conduit extending between the or each outlet and the waste fluid reservoir, and configured to transport fluid from the or each outlet to the waste fluid reservoir.

Preferably, the apparatus comprises a pump, preferably a vacuum pump, configured to draw fluid from the or each outlet. Advantageously, the pump draws air through the inlet and through the slide when the slide is present. Preferably, the pump is configured to draw fluid from the or each outlet, along the waste fluid conduit and into the waste fluid reservoir. Preferably, the apparatus comprises an air conduit extending between the waste fluid reservoir and the pump. Advantageously, the vacuum pump causes a negative pressure in the waste fluid reservoir thereby causing fluid in the chamber to flow through the outlet, along the waste fluid conduit and into the waste fluid reservoir.

Preferably, the air conduit comprises a filter. Preferably, the filter is a hydrophobic filter. Preferably, the filter has a pore size of pore size of less than 10 μm, more preferably less than 5 μm, less than 4 μm, less than 3 μm, less than 2 μm or less than 1 μm, and most preferably less than 0.75 μm, less than 0.5 μm or less than 0.25 μm. Advantageously, the filter prevents liquid and other waste in the waste reservoir from entering the pump.

In some embodiments, the apparatus comprises an air pump configured to pump air into the or each inlet.

Preferably, the apparatus comprises a sensor configured to detect if a slide is disposed in the cleaning chamber. Preferably, the sensor is configured to detect if a slide is disposed in the cleaning chamber and the cover is in the closed configuration. Preferably, the sensor is disposed in the base of the chamber. Preferably, the sensor comprises a projection movable between a first, extended position in which the projection extends above the base of the chamber and a second, retracted position in which the projection lies substantially flush with the base of the chamber. Preferably, the sensor comprises biasing means configured to bias the sensor into the first, extended position. Preferably, the biasing means comprises a spring. Preferably, in the first, extended position, the projection extends a height above the base of the chamber which is less than the depth of the chamber. Accordingly, in the first, extended position, the sensor may extend between 0.1 mm and 5 mm above the base of the chamber, preferably between 0.2 mm and 2.5 mm, between 0.4 mm and 2 mm, between 0.6 mm and 1.5 mm or between 0.7 mm and 1.4 mm above the base of the chamber, and most preferably between 0.8 mm and 1.2 mm above the base of the chamber. Preferably, the projection is configured to move into the second, retracted position when a slide is placed in the chamber and the cover is moved into the closed configuration.

Preferably, the slide cleaner comprises control means configured to run a wash cycle on the apparatus. Preferably, the apparatus comprises activation means which, when activated by a user, is configured to send a signal to the control means, and thereby initiate the wash cycle. The activation means may comprise a button. Preferably, when the activation means sends a signal to the control means, the control means is configured to check the position of the projection. Preferably, if the projection is in the second, retracted position, the control means is then configured to run a wash cycle or a drying cycle. Preferably, the control means is configured to only run a wash cycle or a drying cycle when the projection is disposed in the second, retracted position.

Preferably, the apparatus is configured to run an automatic wash cycle. Preferably, the automatic wash cycle comprises a duration of between 0.001 and 120 seconds. Advantageously, it is possible to clean a slide in a time of between 0.001 and 120 seconds.

Preferably, the apparatus comprises selection means configured to allow the user to select an automatic wash cycle. Preferably, the selection means comprises a switch, more preferably a toggle switch, more preferably, the switch is biased in a first position. Preferably, when the switch is in the first position and the activation means is activated, the controller is configured to run an automatic wash cycle.

Preferably, at the start of the automatic wash cycle, the control means is configured to send a signal to the vacuum pump to thereby cause the vacuum pump to turn on and to remove fluid from the cleaning chamber. Preferably, at the end of the automatic wash cycle, the control means is configured to send a signal to the vacuum pump to thereby cause the vacuum pump to turn off. Preferably, the control means is configured to leave the vacuum pump on for the duration of the automatic wash cycle.

Preferably, the control means is configured to run a cleaning fluid phase during the automatic wash cycle. Preferably, at the start of the cleaning fluid phase, the control means is configured to send a signal to the cleaning fluid pump to thereby cause the cleaning fluid pump to turn on and to feed cleaning fluid into the or each inlet and through the slide chamber. Preferably, the control means is configured to send the signal to the cleaning fluid pump to thereby cause the cleaning fluid pump to turn on at the start of the automatic wash cycle. Preferably, at the end of the cleaning fluid phase, the control means is configured to send a signal to the cleaning fluid pump to thereby cause the cleaning fluid pump to turn off.

Preferably, the control means is configured to run multiple cleaning fluid phases during the wash cycle. Accordingly, the control means may be configured to run between 1 and 30 cleaning fluid phases during the automatic wash cycle, preferably between 2 and 20 cleaning fluid phases during the automatic wash cycle, more preferably between 3 and 10 cleaning fluid phases during the automatic wash cycle, and most preferably between 4 and 5 cleaning fluid phases during the automatic wash cycle. Preferably, the time between consecutive cleaning fluid phases is between 0.001 and 120 seconds or between 0.005 and 60 seconds, more preferably between 0.01 and 30 seconds or between 0.05 and 10 seconds, most preferably between 0.5 and 5 seconds or between 0.5 and 3 seconds.

Preferably, the control means is configured to run the or each cleaning fluid phase for between 0.001 and 120 seconds or between 0.005 and 60 seconds, more preferably between 0.01 and 30 seconds or between 0.05 and 10 seconds, most preferably between 0.5 and 5 seconds or between 1 and 3 seconds.

In one embodiment, the control means is configured to initiate a first cleaning fluid phase at the same time as initiating the automatic wash cycle.

In one embodiment, the control means is configured to terminate a final cleaning fluid phase at the same time as terminating the automatic wash cycle. However, in one embodiment, the control means is configured to terminate the final cleaning fluid phase between 0.5 and 500 seconds before terminating the wash cycle, more preferably between 1 and 250 seconds or between 5 and 100 seconds before terminating the wash cycle, and most preferably between 10 and 30 seconds before terminating the automatic wash cycle. In an alternative embodiment, the control means is configured to terminate the final cleaning fluid phase between 0.1 and 100 seconds before terminating the wash cycle, more preferably between 0.5 and 50 seconds or between 1 and 20 seconds before terminating the wash cycle, and most preferably between 2 and 10 seconds before terminating the automatic wash cycle. Advantageously, the automatic wash cycle comprises a drying phase configured to dry the slide.

The drying phase preferably starts when the final cleaning fluid phase is terminated. In some embodiments, the control means is configured to send a signal to the air pump to thereby cause the air pump to turn on and to pump air into the inlets at the start of the drying phase. Preferably, at the end of the automatic wash cycle, the control means is configured to send a signal to the air pump to thereby cause the air pump to turn off. Advantageously, the air pump increases the speed at which the slide dries.

The selection means preferably allows a user to select a manual wash cycle. In embodiments where the selection means comprises a switch, the apparatus may be configured to initiate the manual wash cycle when a user disposes the switch in a second position. The apparatus may be configured to terminate the manual wash cycle when the switch returns to the first position. Preferably, the apparatus comprises biasing means configured to urge the switch into the first position. Advantageously, the biasing means return the switch to the first position when a user releases the switch.

Preferably, at the start of the manual wash cycle, the control means is configured to send a signal to the cleaning fluid pump to thereby cause the cleaning fluid pump to turn on and to feed cleaning fluid into the or each inlet and through the slide chamber. Preferably, at the end of the manual wash cycle, the control means is configured to send a signal to the cleaning fluid pump to thereby cause the cleaning fluid pump to turn off. Preferably, the control means is configured to leave the cleaning fluid pump on for the duration of the manual wash cycle.

Preferably, at the start of the manual wash cycle, the control means is configured to send a signal to the vacuum pump to thereby cause the vacuum pump to turn on and to remove fluid from the cleaning chamber. Preferably, at the end of the manual wash cycle, the control means is configured to send a signal to the vacuum pump to thereby cause the vacuum pump to turn off. Preferably, the control means is configured to leave the vacuum pump on for the duration of the manual wash cycle.

The selection means preferably allows a user to select a manual drying cycle. In embodiments where the selection means comprises a switch, the apparatus may be configured to initiate the manual wash cycle when a user disposes the switch in a third position. The apparatus may be configured to terminate the manual drying cycle when the switch returns to the first position. Preferably, the apparatus comprises biasing means configured to urge the switch into the first position. Advantageously, the biasing means return the switch to the first position when a user releases the switch.

Preferably, at the start of the manual drying cycle, the control means is configured to send a signal to the vacuum pump to thereby cause the vacuum pump to turn on and to remove fluid from the cleaning chamber. Preferably, at the end of the manual drying cycle, the control means is configured to send a signal to the vacuum pump to thereby cause the vacuum pump to turn off. Preferably, the control means is configured to leave the vacuum pump on for the duration of the manual drying cycle.

Preferably, at the start of the manual drying cycle, the control means is configured to send a signal to the air pump to thereby cause the air pump to turn on and to pump air into the inlets at the start of the drying phase. Preferably, at the end of the manual drying cycle, the control means is configured to send a signal to the air pump to thereby cause the air pump to turn off.

Preferably, the apparatus comprises ejection means, configured to eject a slide from the chamber. Preferably, the ejection means comprises the sensor. Preferably, the projection is movable to a third, further extended position, in which the projection extends a height above the base of the chamber which is greater than the depth of the chamber. Preferably, in the third, further extended position, the sensor may extend between 1 mm and 50 mm above the base of the chamber, preferably between 2 mm and 25 mm, between 3 mm and 20 mm, between 4 mm and 15 mm or between 5 mm and 10 mm above the base of the chamber, and most preferably between 6 mm and 8 mm above the base of the chamber. Advantageously, in the third, further extended position, the sensor lifts the slide up, aiding removal from the chamber.

The ejection means may comprise an actuation means which is configured to move the sensor into the third, further extended position when actuated. The actuation means may be configured to send a signal to the control means when actuated, and the control means may be configured to then send a signal to the sensor to thereby cause the projection to move into the third, further extended position. The actuation means may comprise a button. In a preferred embodiment, the activation means also acts as the actuation means. Preferably, when the activation means sends a signal to the control means, the control means is configured to check the position of the projection, and if the projection is in the first, extended position, the control means is then configured to cause the projection to move to the third, further extended position.

The inventor believes that the method of cleaning the slide is novel per se.

Accordingly, in accordance with a second aspect, there is provided a method of cleaning a cell counting slide, the method comprising:
placing a cell counting slide into a cleaning chamber;
substantially aligning an inlet of the slide with a cleaning fluid inlet in the chamber;
feeding cleaning fluid through the cleaning fluid inlet, into the cleaning chamber and the inlet of the slide and allowing the cleaning fluid to flow through the slide; and
removing fluid from the cleaning chamber and slide via a cleaning fluid outlet in the chamber.

Preferably, the method comprises aligning two inlets of the slide with two cleaning fluid inlets in the chamber. Preferably, the method comprises feeding the cleaning fluid through the two cleaning fluid inlets, into the cleaning chamber and the two inlets of the slide and allowing the fluid to flow through the slide.

Preferably, feeding cleaning fluid through the cleaning fluid inlet comprises feeding cleaning fluid through a cleaning fluid injector disposed in the cleaning fluid inlet.

Preferably, the method comprises aligning an outlet of the slide with the cleaning fluid outlet in the chamber. More preferably, the method comprises aligning two outlets of the slide with two cleaning fluid outlets in the chamber. Preferably, the method comprises removing fluid from the cleaning chamber and slide via the two cleaning fluid outlets in the chamber.

Preferably, the method comprises removing fluid from the cleaning chamber and slide via the or each outlet by generating a vacuum configured to draw fluid through the or each outlet.

Preferably, subsequent to placing the slide into the cleaning chamber and prior to discharging the cleaning fluid into the chamber, the method comprises placing a cover over the chamber. Preferably, the method comprises locking the cover in place.

Preferably, prior to discharging the cleaning fluid into the chamber, the method comprises sensing a slide in the chamber and the cover over the chamber.

Preferably, discharging a cleaning fluid into the chamber comprises discharging a cleaning fluid into the chamber for a pre-defined time. More preferably, discharging a cleaning fluid into the chamber comprises discharging a cleaning fluid into the chamber multiple times, wherein each time is separated by a pre-determined interval. Preferably, the pre-determined interval is between 0.001 and 120 seconds or between 0.005 and 60 seconds, more preferably between 0.01 and 30 seconds or between 0.05 and 10 seconds, most preferably between 0.5 and 5 seconds or between 0.5 and 3 seconds.

Preferably, discharging a fluid into the chamber comprises discharging a cleaning fluid into the chamber between 1 and 30 times, or between 2 and 20 times, more preferably between 3 and 10, and most preferably between 4 and 5. Preferably, the pre-defined time is between 0.001 and 120 seconds or between 0.005 and 60 seconds, more preferably between 0.01 and 30 seconds or between 0.05 and 10 seconds, most preferably between 0.5 and 5 seconds or between 1 and 3 seconds.

Preferably, removing fluid from the cleaning chamber comprises removing cleaning fluid and/or air from the cleaning chamber. Preferably, the method comprises removing fluid from the cleaning chamber and slide simultaneously to discharging a cleaning fluid into the chamber. Preferably, the method comprises removing fluid from the cleaning chamber during the or each pre-determined interval.

Preferably, after cleaning fluid has been discharged into the chamber or, in embodiments where it is discharged multiple times, after it has been discharged for a final time the method comprises drying the slide. The slide may be dried using a negative pressure. It may be appreciated that a negative pressure is any pressure which is less than ambient pressure. Accordingly, it may be appreciated that the air may be drawn through the inlets due to a negative pressure having been created downstream thereof. Accordingly, drying the slide may comprise removing fluid from the cleaning chamber for between 0.5 and 500 seconds, more preferably between 1 and 250 seconds or between 5 and 100 seconds, and most preferably between 10 and 30 seconds.

However, in an alternative embodiment, the slide may be dried using a positive pressure. It may be appreciated that a positive pressure is any pressure which is greater than ambient pressure. Accordingly, it may be appreciated that the air may be forced through the inlets due to a positive pressure having been created upstream thereof. Accordingly, in an alternative embodiment, drying the slide comprises feeding air into the inlets for between 0.1 and 100 seconds before terminating the wash cycle, more preferably between 0.5 and 50 seconds or between 1 and 20 seconds before terminating the wash cycle, and most preferably between 2 and 10 seconds before terminating the automatic wash cycle. Advantageously, the slide dries quicker using a positive pressure.

Preferably, the method then comprises removing the cover.

Preferably, the method comprises ejecting the slide from the chamber. Preferably, ejecting the slide from the chamber comprises moving a projection to a further extended position, whereby the projection extends a height above the base of the chamber which is greater than the depth of the chamber. Preferably, the method comprises manually removing the slide from the chamber.

All features described herein (including any accompanying claims, abstract and drawings), and/or all of the steps of any method or process so disclosed, may be combined with any of the above aspects in any combination, except combinations where at least some of such features and/or steps are mutually exclusive.

Embodiments of the present invention will now be described, by way of example only, with reference to the accompanying drawings, in which.

Figure 1:
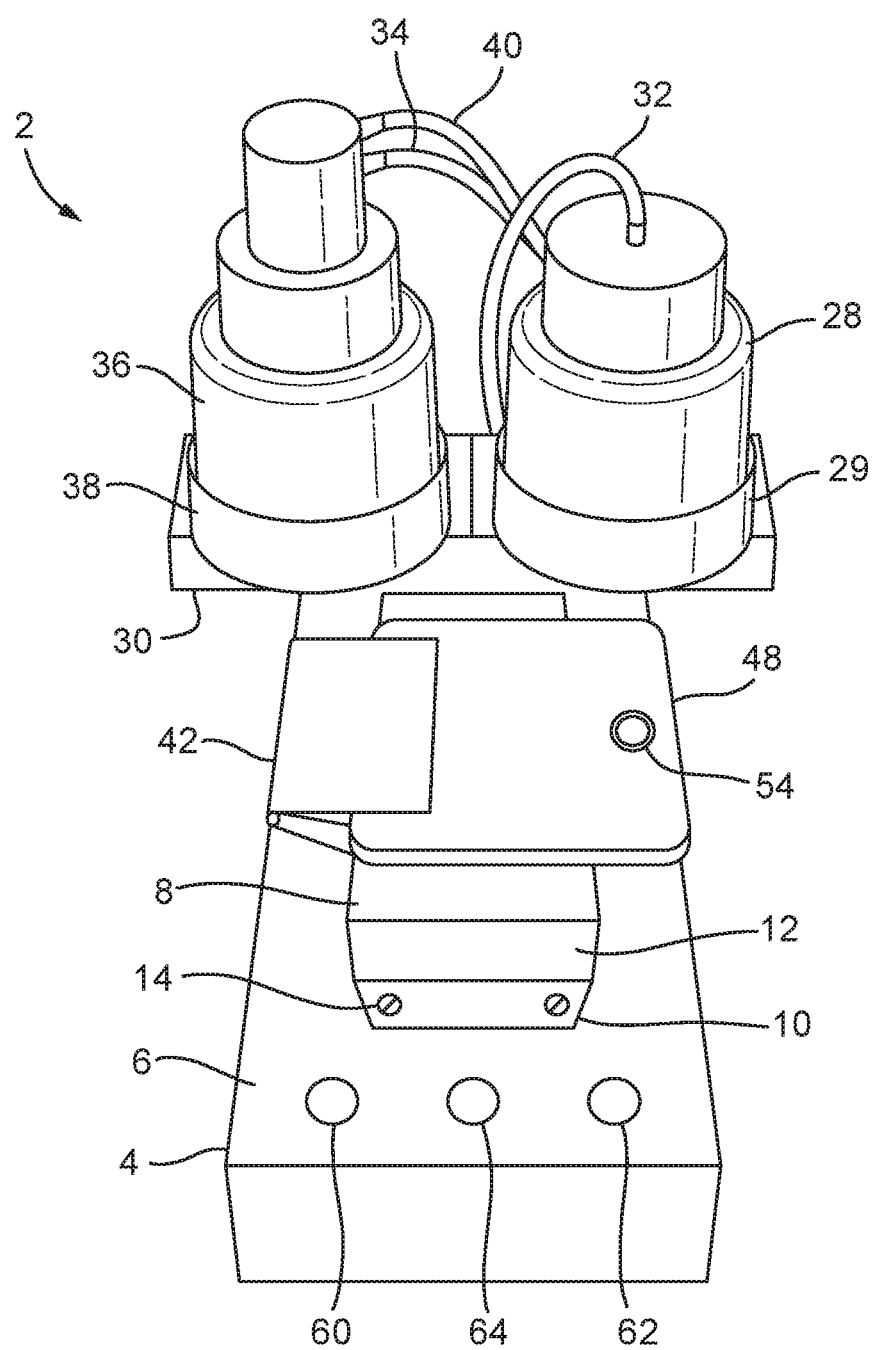
FIG. 1 is a front view of a slide cleaner according to an embodiment of the present invention.
Figure 2:
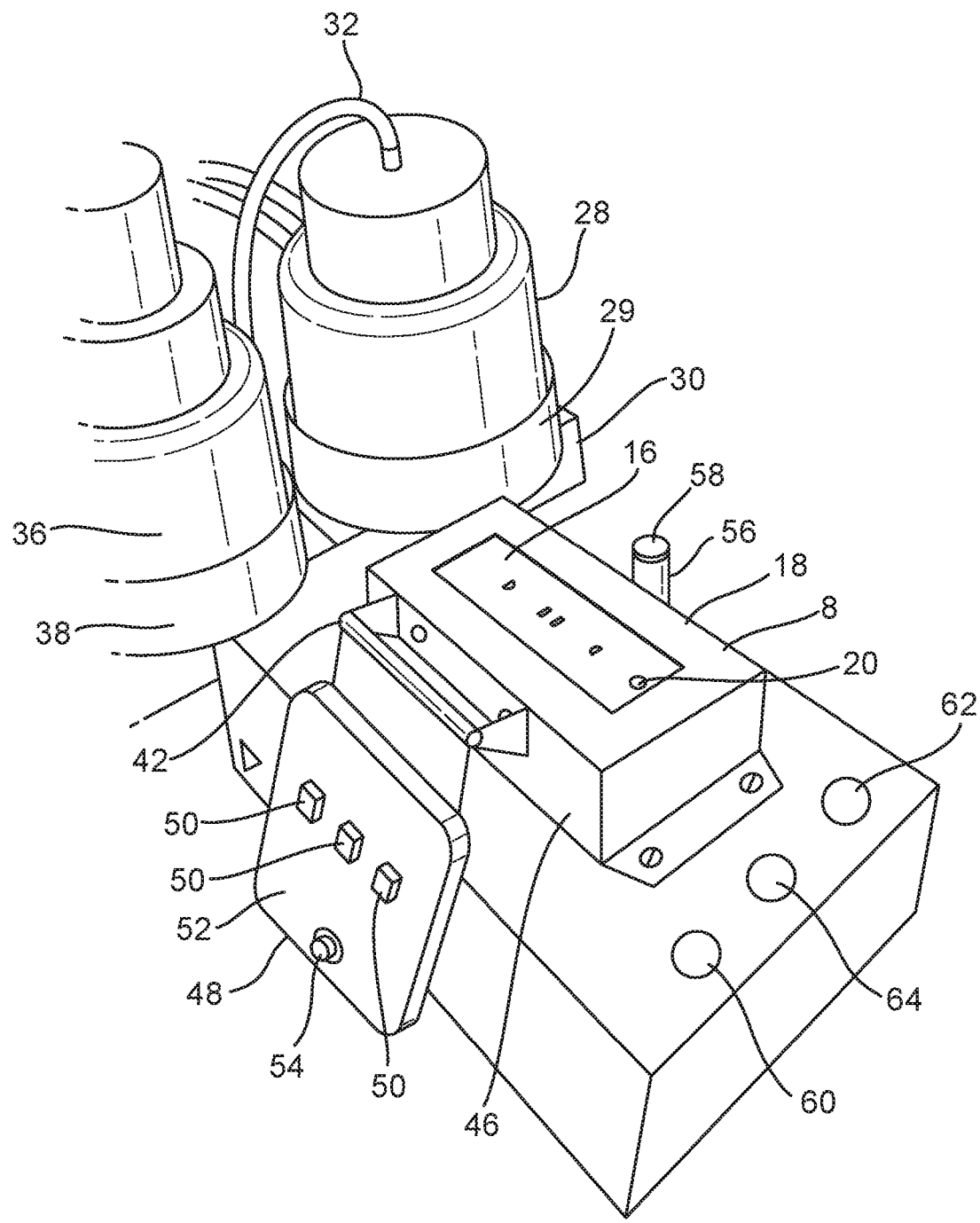
FIG. 2 is a side perspective view of the slide cleaner of FIG. 1.
Figure 3B:
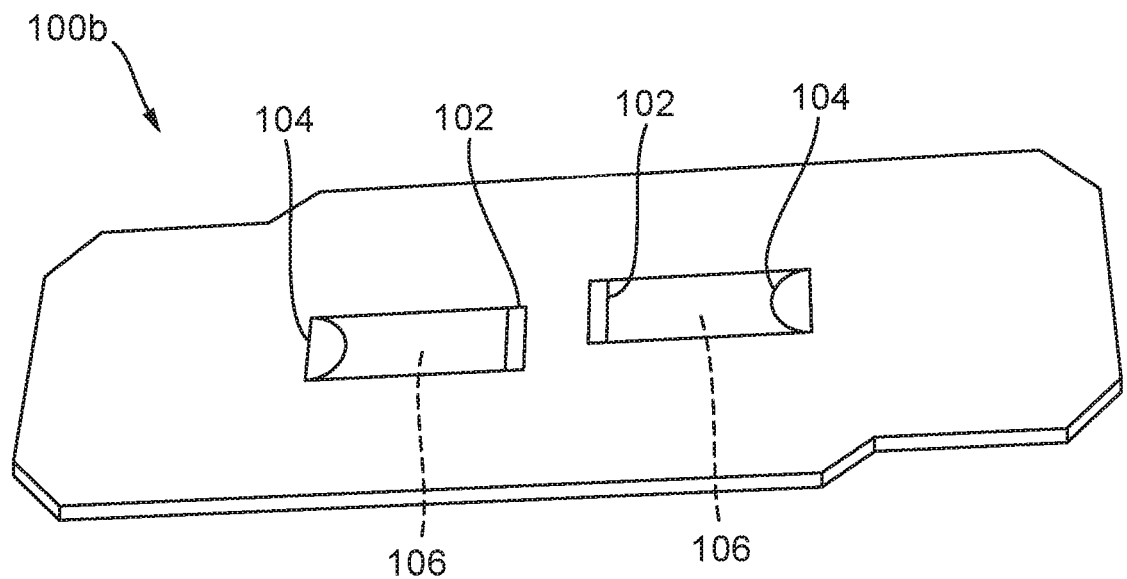
Figure 3C:
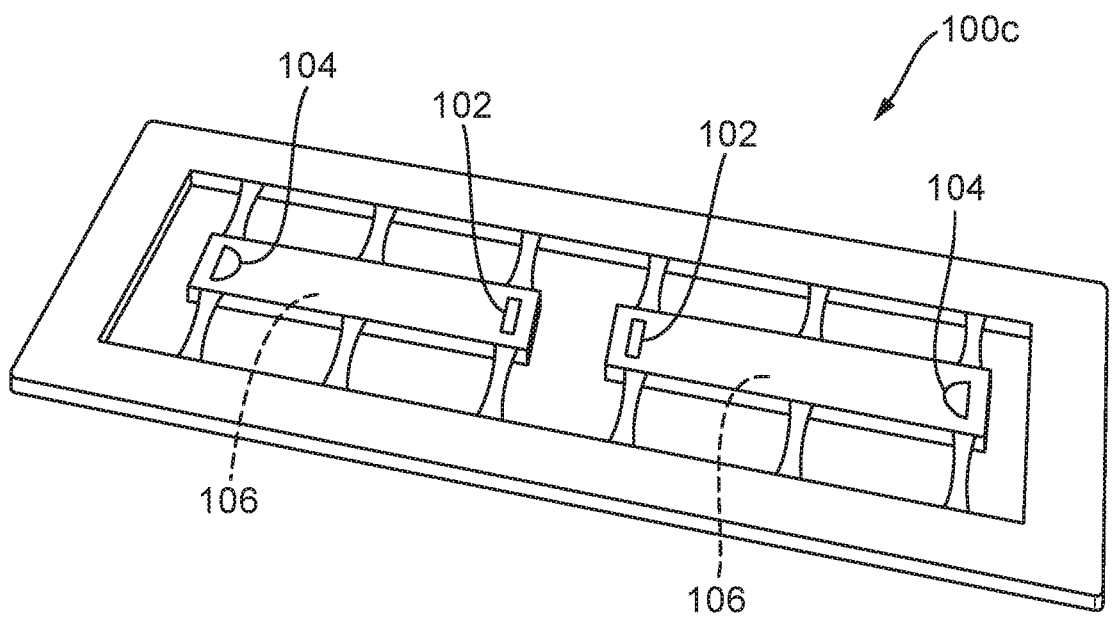
Figure 4:
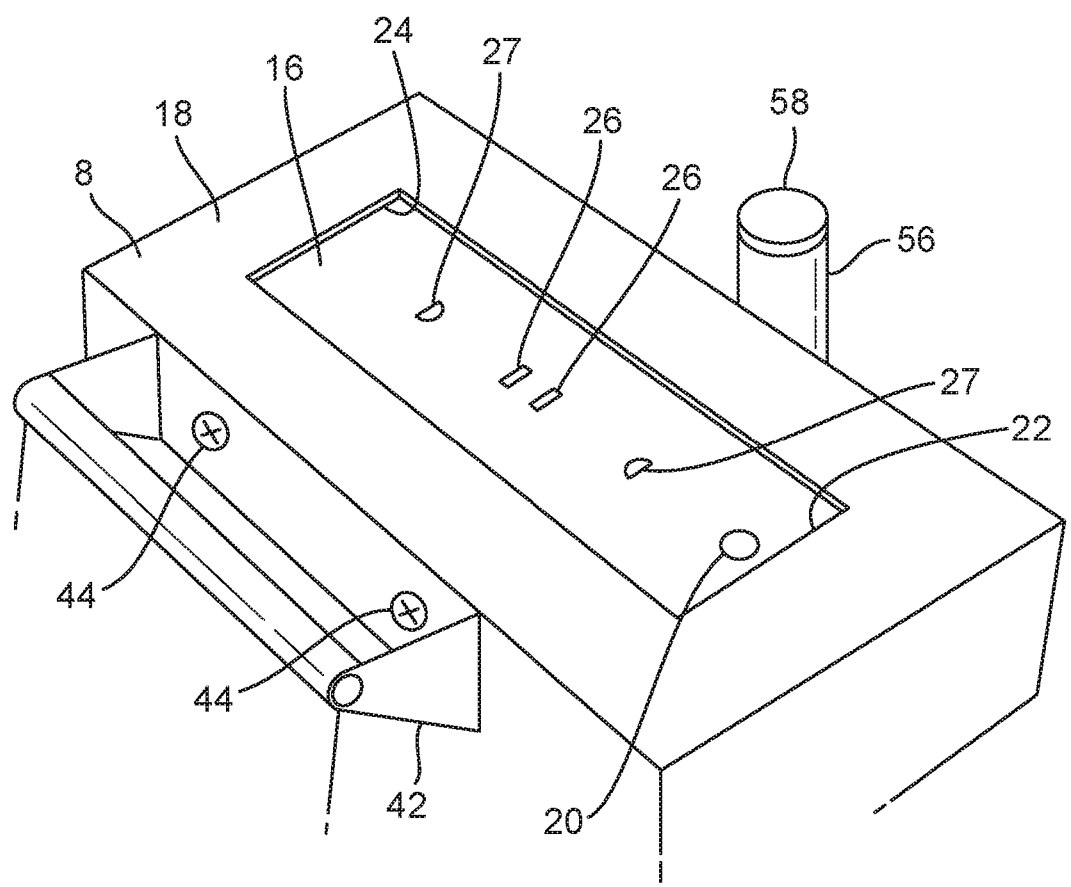
Figure 5:
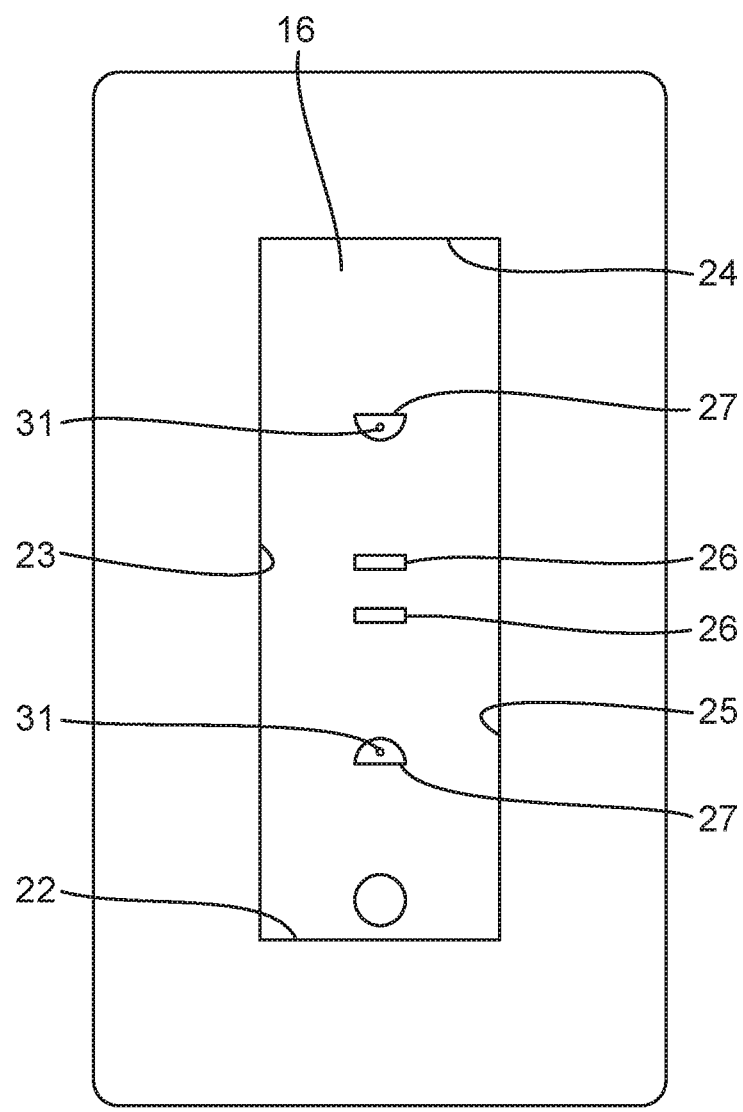
Figure 6:
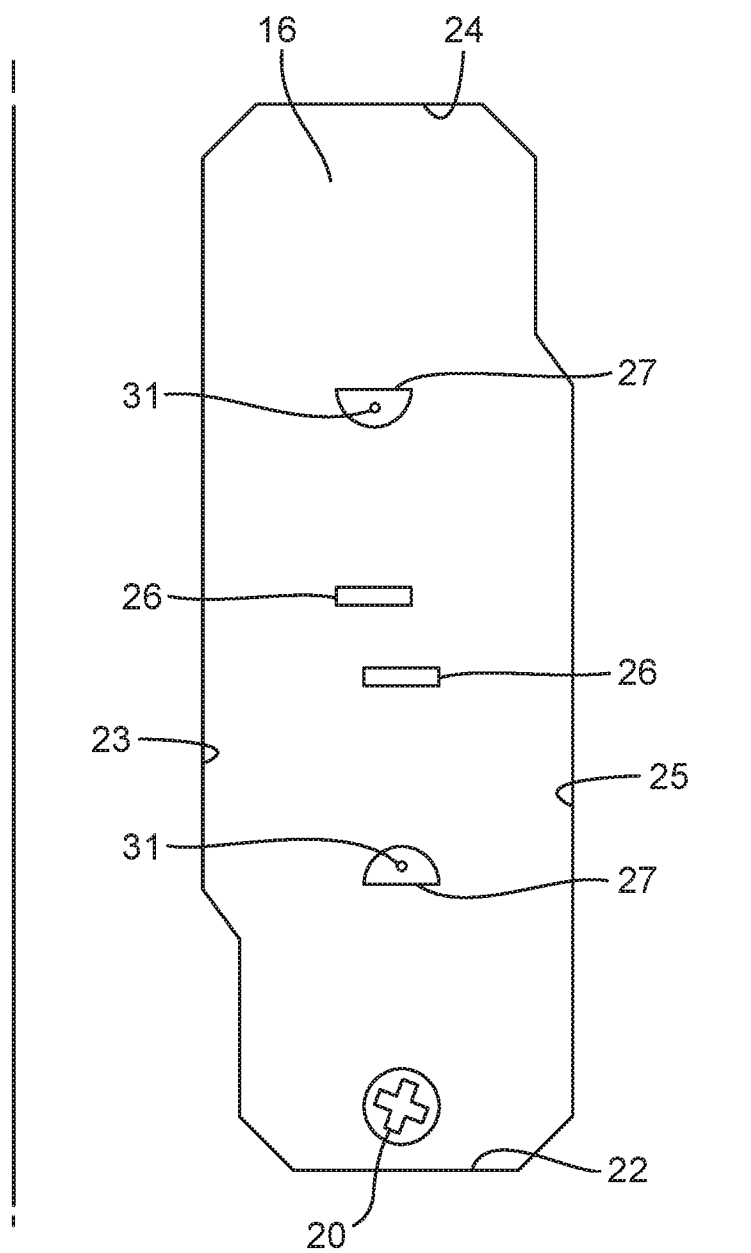
Figure 7:
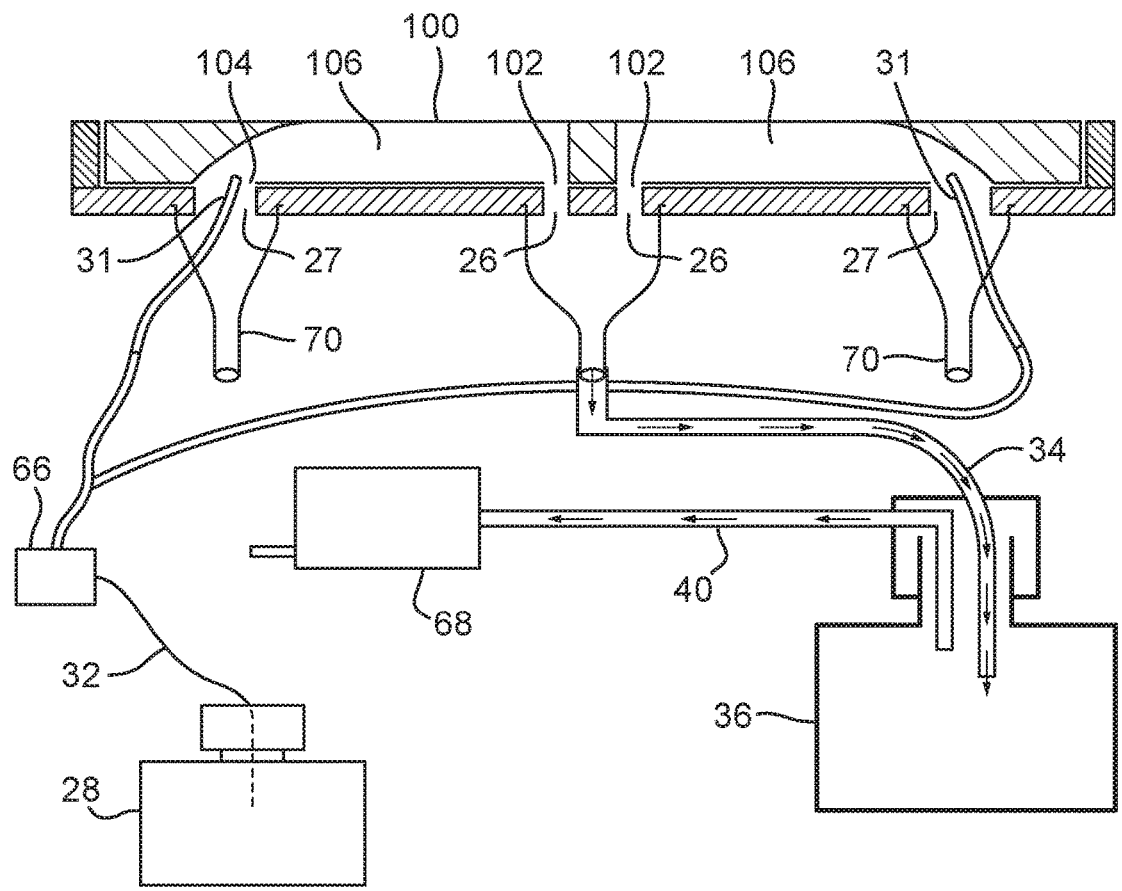
Figure 8:
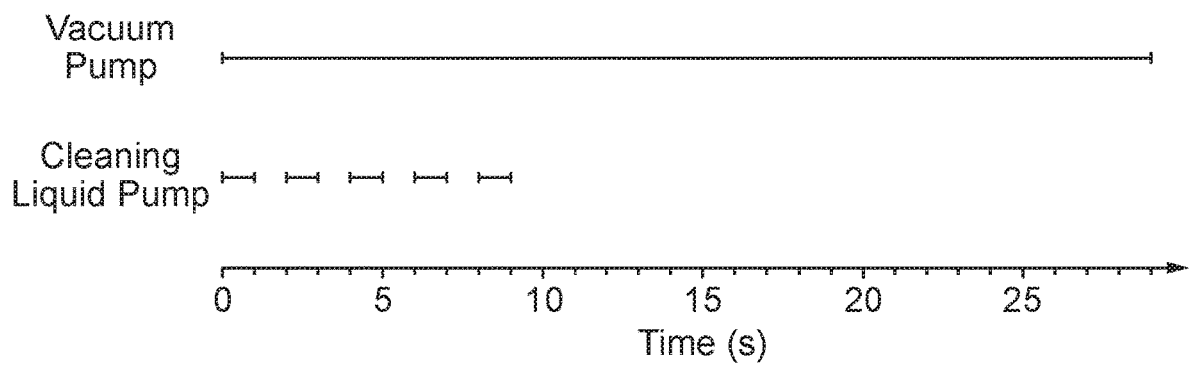
Figure 9:
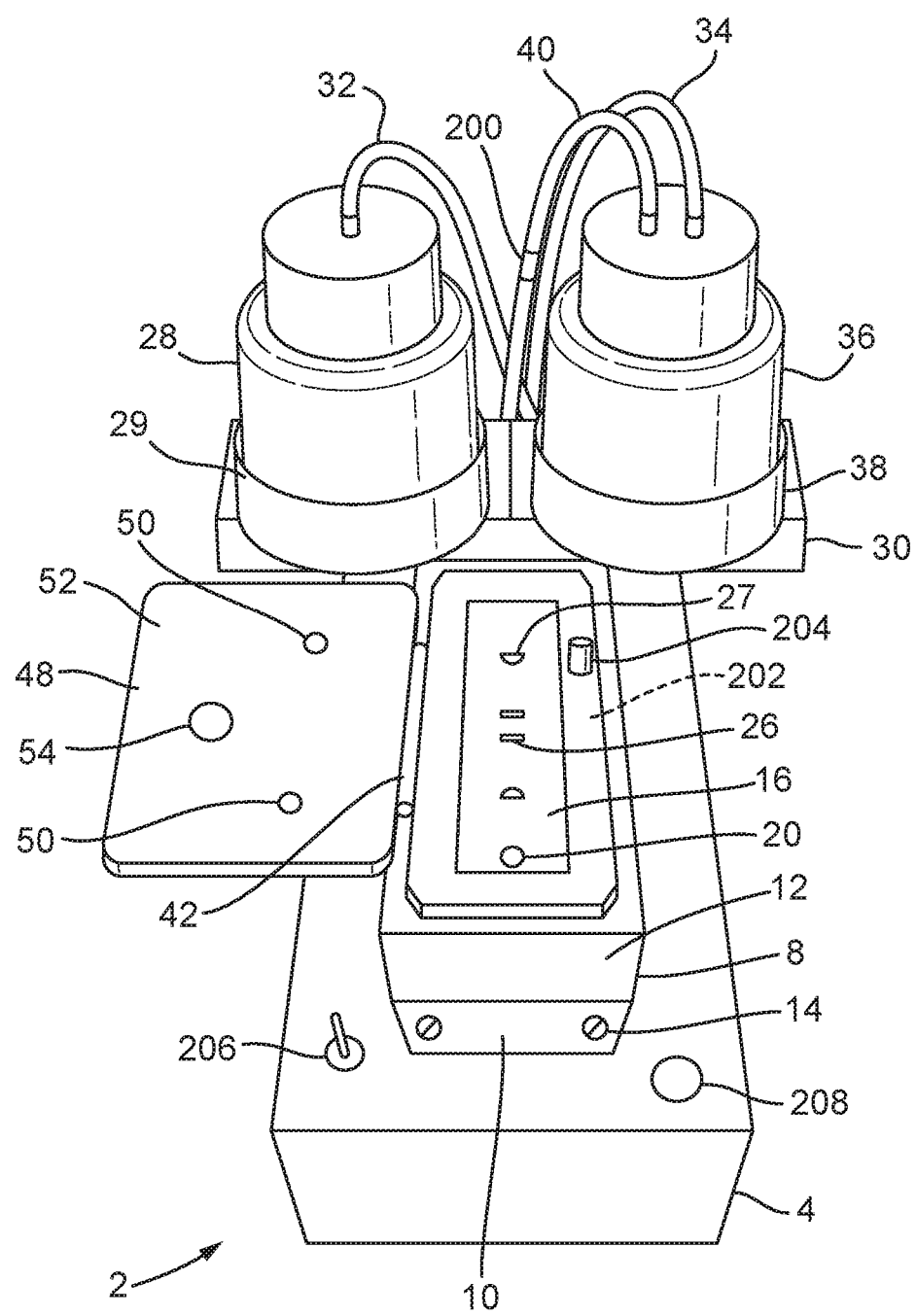

FIG. 3 shows two embodiments of a cell counting slide which can be cleaned using a slide cleaner, FIG. 3a is a Countess® cell counter slide; FIG. 3b is a Bio-Rad TC20® cell counter slide and; FIG. 3c is Luna® cell counter slide;

FIG. 4 is a perspective view of a slide support platform which forms part of the slide cleaner of FIGS. 1 and 2;

FIG. 5 is a top plan view of the slide support platform of FIG. 4;

FIG. 6 is a top plan view of an alternative slide support platform;

FIG. 7 is a schematic diagram of the slide cleaner;

FIG. 8 is a schematic diagram illustrating the timings of a suitable wash cycle; and FIG. 9 is a front view of an alternative slide cleaner.

A slide cleaner apparatus 2 is shown in FIGS. 1 and 2, and is used to clean (i.e. wash and dry) a cell counting slide 100, three embodiments of which are shown in FIG. 3. It will be appreciated that the shape of the slides vary. The apparatus 2 shown in FIG. 1 is designed for use with a Countess® cell counter slide 100a, as shown in FIG. 3a. However, as explained below, the apparatus can be modified to be used with other slides, such as a Bio-Rad TC20® cell counter slide 100b or a Luna® cell counter slide 100c, as shown in FIGS. 3b and 3c. The apparatus 2 comprises a main body 4 which is substantially cuboid in shape. Disposed on a top face 6 of the body 4 is a substantially cuboid platform 8, which is shown in detail in FIG. 4. The platform 8 comprises a first flange 10 which extends from a front face 12 of the platform 8, and second flange (not shown) which extends from a back face (not shown) of the platform 8. Screws 14 extend through the flanges 10 and into the body 4, thereby fixing the platform 8 to the body 4.

As shown in FIG. 2, the platform 8 defines a chamber 16, which comprises a generally cuboid recess in a top face 18 of the platform 8. The chamber 16 is sized to receive a cell counting slide 100, for instance a Countess® cell counting chamber slide similar to the slide 100a shown in FIG. 3a. Such slides 100 are 25 mm×75 mm×1.65 mm, and the chamber 16 is 26 mm×76 mm×1.8 mm. The base of the chamber 16 is lined with silicon with a Shore A hardness of 27 at 20° C. for improving the seal with a slide 100 when inserted therein.

As shown in FIG. 4, two spaced apart outlets 26 defining rectangular slits with a length of 1.5 mm and a width of 6 mm are defined in the base of the chamber 16. The outlets 26 are disposed centrally between the left and right 23, 25 sides of the chamber, i.e. with a gap of 10 mm between the outlets 26 and either side 23, 25 of the chamber. The first outlet 26 is disposed 34 mm from a front side 22 of the chamber, the second outlet 26 is disposed 34 mm from a rear side 24 of the chamber, and the gap between the first and second outlets 26 is 4 mm.

A first inlet 27 is disposed between the outlets 26 and a front side 22 of the chamber 16, and a second inlet 27 is disposed between the outlets 26 and a back side 24 of the chamber 16. Both the inlets 27 define a semi-circular shape with a width of 6 mm and a length of 3 mm. The inlets 27 are disposed centrally between the left and right 23, 25 sides of the chamber, i.e. with a gap of 10 mm between the inlets 27 and either side 23, 25 of the chamber. The first inlet 27 is disposed 18 mm from the front side 22 of the chamber and 13 mm from the first outlet 26. The second inlet 27 is disposed 18 mm from the rear side 24 of the chamber and 13 mm from the second outlet 26. The inlets 27 comprise injectors 31 (see FIG. 5) configured to inject a cleaning liquid into the chamber 16. The injectors 31 extend about 0.5 mm above the base of the chamber 16. The cleaning liquid can comprise 1 wt % washing detergent in water and is stored in a cleaning liquid bottle 28 which is disposed in a bottle holder 29 on a platform 30 to the rear of the body 4, as shown in FIG. 1. When a pump 66 is activated it causes the cleaning liquid to flow along a tube 32 which extends between the bottle 28 and the injectors 31 for each inlet 27. This configuration is shown schematically in FIG. 7.

The outlets 26 comprise vacuum points configured to remove waste or spent washing fluid from the chamber 16. Waste washing fluid removed from the chamber 16 is transported by a tube 34 to a waste bottle 36 which is also disposed in a bottle holder 38 on the platform 30. A further tube 40 extends from the waste bottle 36, and when a vacuum pump 68 disposed on the further tube 40 is activated it causes gas to flow from the waste bottle 36, through the further tube 40 and into the atmosphere, thereby creating a negative pressure in the waste bottle 36.

A hinge 42 is fixed by screws 44 to one side 46 of the platform 8, and a cover 48 made from a clear perspex acrylic sheet is attached to the hinge 42. FIG. 1 shows the cover 48 disposed over the chamber 16 in a closed configuration, and FIG. 2 shows the cover 48 in an open configuration, allowing access to the chamber 16. Three projections 50 are disposed on the underside 52 of the cover 48. In the closed configuration, the projections 50 are disposed directly above the chamber 16, such that the central projection aligns with the outlets 26 and the two outer projections align with the inlets 27.

A neodymium magnet 54 is also disposed on the underside of the cover 48, and a column 56 extends upwards from the top face 6 of the body 4 to one right of the platform 8. A further neodymium magnet 58 is mounted at the top of the column 56. In the closed configuration, the magnet 54 on the cover 48 is disposed directly above the magnet 58.

Extending upwards from the base of the chamber 16, there is provided a moveable sensor 20 configured to sense if a slide 100 is disposed in the chamber 16 when the cover 48 is in the closed configuration. When no slide 100 is inserted in the chamber 16, the sensor 20 is disposed in a first, extended position, whereby the sensor extends about 1 mm upwardly from the base of the chamber 16. When a slide 100 is inserted into the chamber 16 and the cover 48 is moved to the closed configuration, then the projections 50 will push down on the slide 100 which in turn will push down on the sensor 20 and cause it to move into a second, retracted position where the top of the sensor 20 is level with the base of the chamber 16. Accordingly, this allows the apparatus 2 to sense when a slide 100 is disposed in the chamber 16 and the cover 48 is in the closed configuration. Due to a spring (not shown) biasing the sensor into the first, extended position, the weight of the slide 100 is insufficient to cause the sensor 100 to move to the second, retracted position if the cover 48 is open. Similarly, if the slide 100 is not present, then the sensor 20 will remain in the first, extended position even when the cover 48 is in the closed configuration.

As explained in more detail below, the sensor is also configured to move to a third, further extended position whereby the sensor extends about 7 mm upwardly from the base of the chamber 16. This aids a user in removing a slide 100 from the chamber 16.

In use, a user inserts a slide 100 into the chamber 16 and then moves the cover 48 to the closed configuration, as shown in FIG. 1. When in position, the slide 100 is located such that inlets 104 in slide 100 align with wash liquid inlets 27, and outlets 102 in the slide 100 align with wash liquid outlets 26. The user then presses a start button 64 disposed in the body 4, which causes a controller disposed in the body 4 to initiate a wash cycle. First, the controller checks the position of the sensor 20, and when it finds that is in the second, retracted position, it will start a wash cycle. The controller will only start a wash cycle if the sensor is in the second, retracted position.

Upon starting the wash cycle, the controller activates the pumps 66, 68. The pump 66 feeds the cleaning liquid along pipe 32, out of the outlets 26 and into the chamber 16. The vacuum pump 68 feeds air from the waste bottle 36 through pipe 40 creating a negative pressure in the waste bottle 36. This causes air to flow through air inlets 70, chamber inlets 27 and slide inlets 104 into the cell chambers 106. The negative pressure also causes the air and cleaning fluid to continue to flow through the cell chambers 106, through the cell outlets 102 and chamber outlets 26, along pipe 34 and into the waste bottle 36. The stream of fluid dislodges cells and any waste liquid from the cell chamber 106. Furthermore, the negative pressure created inside the cell chambers 106 due to air being sucked out of the outlets 26, and a seal being created due to the slide 100 being pressed onto the silicon-lined base of the chamber 16, by projections 50 on the cover 48 when in a closed position and firmly holds the slide 100 in place.

After one second, the controller turns off the pump 66, but maintains the vacuum pump 68 in the on configuration.

This cycle of flushing the chambers 106 with the combination of air flow (vacuum) and cleaning fluid is repeated four more times, as shown in FIG. 8. The inventor has found that this is sufficient to clean the slide loft After the final cycle, the vacuum pump 68 is maintained in the on configuration, thereby flushing the chambers 106 with air to dry the slide 100, for a final 20 or 30 seconds. The controller then turns off the vacuum pump 68, thereby completing the wash cycle.

Once the wash cycle has been completed, a user may move the cover 48 to the open configuration, thereby causing the sensor 20 to move to the first, extended position due to the biasing force of the spring. A user may then press the start button 64 again. As before, this will cause the controller to check the position of the sensor 20, and when it finds that is in the first, extended position, it will cause the sensor to move to the third, further extended position thereby lifting one side of the slide 100 and aiding its removal from the chamber 16. The cleaned slide 100 may then be reused. The sensor 20 will remain in the third, further extended position while the user maintains pressure on the button 64, and once the user releases the button 64 the sensor will revert to the first, extended position.

Buttons 60 and 62 allow a user to control the apparatus manually. Accordingly, button 62 activates and deactivates both the vacuum pump 68 and cleaning fluid pump 66, for flushing the cell chamber 106 of the slide 100. Button 60 activates and deactivates only the vacuum pump 68, causing airflow in the cell chamber 106 of the slide 100, for drying purposes.

ALTERNATIVE EMBODIMENTS

As mentioned above, the chamber 16 shown in FIGS. 4 and 5 and described above is configured to receive a Countess® cell counter slide 100a, as shown in FIG. 3a. However, alternative slides have alternative dimensions and will require a lightly different sized chambers. Accordingly, FIG. 6 shows a chamber 16 which is configured to receive a Bio-Rad TC20® cell counter slide 100b, as shown in FIG. 3b.

The chamber 16 shown in FIG. 6 has an irregular shape corresponding to the shape of the Bio-Rad TC20® cell counter slide 100b. The chamber has a maximum width of 26 mm, a maximum length of 76 mm and a depth of 2 mm.

As with the previously described chamber, the base of the chamber 16 shown in FIG. 6 is also lined with silicon with a Shore A hardness of 27 at 20° C., and a moveable sensor 20 is provided.

Two spaced apart outlets 26 defining rectangular slits with a length of 1.5 mm and a width of 6 mm are defined in the base of the chamber 16. The first outlet 26 is disposed 11.5 mm from the left side 23 of the chamber 16 and 8.5 mm from the right side 25 of the chamber 16. Conversely, the second outlet 26 is disposed 8.5 mm from the left side 23 of the chamber 16 and 11.5 mm from the right side 25 of the chamber 16. The first outlet 26 is disposed 34 mm from a front side 22 of the chamber 16, the second outlet 26 is disposed 34 mm from a rear side 24 of the chamber 16, and the gap between the first and second outlets 26 is 5 mm.

A first inlet 27 is disposed between the outlets 26 and a front side 22 of the chamber 16, and a second inlet 27 is disposed between the outlets 26 and a back side 24 of the chamber 16. Both the inlets 27 define a semi-circular shape with a width of 6 mm and a length of 3 mm. Similarly to the outlets 26, the first inlet 27 is disposed 11.5 mm from the left side 23 of the chamber 16 and 8.5 mm from the right side 25 of the chamber 16 and the second inlet 26 is disposed 8.5 mm from the left side 23 of the chamber 16 and 11.5 mm from the right side 25 of the chamber 16. The first inlet 27 is disposed 19 mm from the front side 22 of the chamber and 14 mm from the first outlet 26. The second inlet 27 is disposed 19 mm from the rear side 24 of the chamber and 14 mm from the second outlet 26. As with the previously described chamber, the inlets 27 comprise injectors 31 configured to inject a cleaning liquid into the chamber 16.

While, not shown it will be appreciated that alternative chambers 16 could be provided for use with other slides, such as the Luna® cell counter slide 100c.

It will be appreciated that in a further alternative embodiment, in addition to or instead of the vacuum pump 68, the apparatus may comprise a further pump configured to pump air into inlets 27. This pump could be activated for the whole of the wash cycle, or only for the drying phase.

FURTHER ALTERNATIVE EMBODIMENT

A further alternative embodiment is shown in FIG. 9. The embodiment comprises a slide cleaner apparatus 2. Similar to the embodiment shown in FIG. 1, the apparatus 2 shown in FIG. 9 comprises a main body 4 which is substantially cuboid in shape. Disposed on a top face 6 of the body 4 is a substantially cuboid platform 8, comprising a first flange 10 which extends from a front face 12 of the platform 8, and second flange (not shown) which extends from a back face (not shown) of the platform 8. Screws 14 extend through the flanges 10 and into the body 4, thereby fixing the platform 8 to the body 4.

The platform 8 defines a chamber 16, which is similar to the chamber described above in relation to the embodiment shown in FIGS. 1 and 2. However, unlike the previously described embodiment, the base of the chamber 16 is lined with silicon with a Shore A hardness of 15 at 20° C. for improving the seal with a slide 100 when inserted therein.

As explained in more detail above, the chamber comprises outlets 26 which comprise vacuum points configured to remove waste or spent washing fluid from the chamber 16. Waste washing fluid removed from the chamber 16 is transported by a tube 34 to a waste bottle 36 which is also disposed in a bottle holder 38 on a platform 30. A further tube 40 extends from the waste bottle 36, and when a vacuum pump 68 disposed on the further tube 40 is activated it causes air to flow from the waste bottle 36, through the further tube 40 and into the atmosphere, thereby creating a negative pressure in the waste bottle 36.

In the illustrated embodiment, the further tube 40 comprises a hydrophobic filter 200. The filter 200 is a hydrophobic PTFE (polytetrafluoroethylene) filter with a pore size of 0.22 µm. This filter 200 prevents any waste over flow from waste bottle 36 from entering into the vacuum pump 68.

As described in relation to the embodiment illustrated in FIGS. 1 and 2, a hinge 42 attaches a cover 48 to the platform 8. In the illustrated embodiment, two projections 50 are disposed on the underside 52 of the cover 48. In the closed configuration, the projections 50 are disposed directly above the inlets 27.

A neodymium magnet 54 is also disposed on the underside of the cover 48. Furthermore, in the embodiment illustrated in FIG. 9, a further neodymium magnet 202 is disposed in the platform 8. In the closed configuration, the magnet 54 on the cover 48 is disposed directly above the magnet 202 disposed in the platform 8.

The platform further comprises a bumper 204. The bumper 204 is the tip of a spring loaded slow motion piston, the outer layer of which comprises rubber. The bumper 204 prevents the cover 48 from slamming when closed.

In use, a user inserts a slide 100 into the chamber 16 and then moves the cover 48 to the closed configuration. When in position, the slide 100 is located such that inlets 104 in slide 100 align with wash liquid inlets 27, and outlets 102 in the slide 100 align with wash liquid outlets 26. As explained in more detail below, the apparatus 2 comprises a toggle switch 206 which is biased in a central position.

If the user leaves the toggle switch 206 in the central position and press a start button 208 disposed in the body 4 thereby causing the apparatus to initiate a wash cycle. First, the controller checks the position of the sensor 20, and when it finds that is in the second, retracted position, it will start a wash cycle. The controller will only start a wash cycle if the sensor is in the second, retracted position.

Upon starting the wash cycle, the controller activates the pumps 66, 68. The pump 66 feeds the cleaning liquid along pipe 32, out of the outlets 26 and into the chamber 16.

The vacuum pump 68 feeds air from the waste bottle 36 through pipe 40 creating a negative pressure in the waste bottle 36. This causes air to flow through air inlets 70, chamber inlets 27 and slide inlets 104 into the cell chambers 106. The negative pressure also causes the air and cleaning fluid to continue to flow through the cell chambers 106, through the cell outlets 102 and chamber outlets 26, along pipe 34 and into the waste bottle 36. The stream of fluid dislodges cells and any waste liquid from the cell chamber 106. Furthermore, the negative pressure created inside the cell chambers 106 due to air being sucked out of the outlets 26, and a seal being created due to the slide 100 being pressed onto the silicon-lined base of the chamber 16, by projections 50 on the cover 48 when in a closed position and firmly holds the slide 100 in place.

After one second, the controller turns off the pump 66, but maintains the vacuum pump 68 in the on configuration.

This cycle of flushing the chambers 106 with the combination of air flow (vacuum) and cleaning fluid is repeated four more times, as shown in FIG. 8. The inventor has found that this is sufficient to clean the slide 100. After the final cycle, the vacuum pump 68 is maintained in the on configuration, thereby flushing the chambers 106 with air to dry the slide 100, for a final 20 or 30 seconds. The controller then turns off the vacuum pump 68, thereby completing the wash cycle.

If the user does not want to run an automated wash cycle as described above, they can run a manual wash or dry cycle by manipulating a toggle switch 206. If the user pushes the toggle switch 206 to the right this will cause the apparatus 2 to run a manual wash cycle. First the controller checks the position of the sensor 20, and if it finds that is in the second, retracted position, it will activates both of the pumps 66, 68. The controller will only activate the pumps 66, 68 if the sensor is in the second, retracted position. The pumps 66, 68 will continue to run, causing cleaning fluid and air to flow through the chamber 16, until the user releases the toggle switch 206. Once the toggle switch is released the controller will turn off both of the pumps 66, 68, and the toggle switch will return to the central position.

Alternatively, the user can push the toggle switch 206 to the left to cause the apparatus 2 to run a manual drying cycle. First the controller checks the position of the sensor 20, and if it finds that is in the second, retracted position, activates the vacuum pump 68.

The controller will only activate the vacuum pump 68 if the sensor is in the second, retracted position. The vacuum pump 68 will continue to run, causing air to flow through the chamber 16, until the user releases the toggle switch 206.

Once the toggle switch is released the controller will turn off the vacuum pump 68, and the toggle switch will return to the central position.

Once the manual or automatic cycle has been completed, a user may move the cover 48 to the open configuration, thereby causing the sensor 20 to move to the first, extended position due to the biasing force of the spring. A user may then press the start button 208 again. As before, this will cause the controller to check the position of the sensor 20, and when it finds that is in the first, extended position, it will cause the sensor to move to the third, further extended position thereby lifting one side of the slide 100 and aiding its removal from the chamber 16. The slide 100 may then be reused. The sensor 20 will remain in the third, further extended position while the user maintains pressure on the button 208, and once the user releases the button 208 the sensor will revert to the first, extended position.

CONCLUSION

The inventor has found that it is possible to re-use supposedly disposable slides 100 at least fifteen times by cleaning them in the manner described above. This dramatically reduces the costs of using a cell counting machine. It also dramatically reduces the plastic biological wastage helping research laboratories become more ecological and environmentally friendly.

Furthermore, since the slides are not cleaned manually, the risk of a user being exposed to biologically hazardous material is dramatically reduced.

The invention claimed is:

1. A slide cleaner apparatus comprising:
   a cleaning chamber being configured to receive a cell counting slide therein, wherein the cleaning chamber has a base comprising a silicon lining;
   at least one fluid inlet disposed in the base of the cleaning chamber and arranged to align with an inlet on a cell counting slide when it is located in the cleaning chamber, wherein the at least one fluid inlet is configured to feed cleaning fluid into the cleaning chamber and the cell counting slide;
   at least one fluid outlet disposed in the base of the cleaning chamber and configured to remove cleaning fluid from the cleaning chamber and the cell counting slide; and
   a vacuum pump connected to the at least one fluid outlet and configured to draw fluid from the at least one fluid outlet.

2. The slide cleaner apparatus according to claim 1, wherein the cleaning chamber defines a maximum length of between 50 mm and 200 mm, a maximum width of between 10 mm and 100 mm and a depth of between 1 mm and 20 mm.

3. The slide cleaner apparatus according to claim 1, wherein the at least one fluid inlet has a semi-circular shaped cross-section and/or comprises a fluid injector configured to feed cleaning fluid into the cleaning chamber and the cell counting slide, and the injector extends between 0.01 mm and 3 mm above the base of the cleaning chamber.

4. The slide cleaner apparatus according to claim 1, wherein the at least one fluid inlet comprises two fluid inlets disposed in the base of the cleaning chamber, and each fluid inlet is arranged to align with an inlet on the cell counting slide when located in the cleaning chamber.

5. The slide cleaner apparatus according to claim 1, wherein the at least one fluid outlet is arranged to align with an outlet on the cell counting slide and/or is a rectangular shape.

6. The slide cleaner apparatus according to claim 1, wherein the at least one fluid outlet comprises two fluid outlets disposed in the base of the cleaning chamber, and each outlet is arranged to align with an outlet on the cell counting slide when located in the cleaning chamber.

7. The slide cleaner apparatus according to claim 1, wherein the silicon lining has a Shore A hardness of between 5 and 40 at 20° C.

8. The slide cleaner apparatus according to claim 1, further comprising a cover removably covering the cleaning chamber and configured to removably cover the cleaning chamber and the cell counting slide when located in the cleaning chamber, optionally wherein the cover comprises at least one cover projection disposed on an underside of the cover, such that when the cover is in a closed configuration the at least one cover projection contacts the cell counting slide when located in the cleaning chamber.

9. The slide cleaner apparatus according to claim 8, further comprising locking means configured to lock the cover in a closed configuration, optionally wherein the locking means comprises a first stud disposed on the cover and a second stud disposed on a locking point, wherein the studs are disposed adjacent to each other when the cover is in the closed configuration, wherein both the first stud and the second stud comprise a magnet.

10. The slide cleaner apparatus according to claim 8, further comprising a sensor disposed in the base of the chamber and configured to detect if the cell counting slide is disposed in the cleaning chamber and the cover is in the closed configuration.

11. The slide cleaner apparatus according to claim 10, wherein the sensor comprises:
   a sensor projection movable between a first, extended position in which the sensor projection extends above the base of the cleaning chamber and a second, retracted position in which the sensor projection lies flush with the base of the cleaning chamber; and
   biasing means configured to bias the sensor projection into the first, extended position;
   and the sensor projection is configured to move into the second, retracted position when the cell counting slide is placed in the cleaning chamber and the cover is moved into the closed configuration, optionally wherein in the first, extended position, the sensor projection extends a height above the base of the cleaning chamber which is less than a depth of the cleaning chamber.

12. The slide cleaner apparatus according to claim 11, further comprising ejection means configured to eject the cell counting slide, optionally wherein the ejection means comprises the sensor projection, such that the sensor projection is movable to a third, further extended configuration, in which the sensor projection extends a height above the base of the cleaning chamber which is greater than the depth of the cleaning chamber.

13. The slide cleaner apparatus according to claim 1, further comprising:
   a cleaning fluid reservoir configured to store cleaning fluid therein,
   a cleaning fluid conduit connected to and extending between the cleaning fluid reservoir and the at least one fluid inlet, and configured to transport cleaning fluid from the cleaning fluid reservoir to the at least one fluid inlet, a waste fluid reservoir configured to store waste fluid therein, a waste fluid conduit connected to and extending between the at least one fluid outlet and the waste fluid reservoir, and configured to transport fluid from the at least one fluid outlet to the waste fluid reservoir, and a cleaning fluid pump connected to the cleaning fluid reservoir and configured to pump cleaning fluid from the cleaning fluid reservoir, along the cleaning fluid conduit to the at least one fluid inlet, wherein the vacuum pump is configured to draw fluid from the at least one fluid outlet, along the waste fluid conduit and into the waste fluid reservoir.

14. The slide cleaner apparatus according to claim 1, further comprising control means configured to run a wash cycle and activation means configured to send a signal to the control means, and thereby initiate the wash cycle, optionally wherein the control means is configured to run an automatic wash cycle which comprises a duration of between 0.001 and 120 seconds.

15. A method of cleaning a cell counting slide, the method comprising:

placing a cell counting slide into a cleaning chamber comprising a base, wherein the base comprises a silicon lining;

aligning an inlet of the cell counting slide with a cleaning fluid inlet in the base of the cleaning chamber;

feeding a cleaning fluid through the cleaning fluid inlet, into the cleaning chamber and the inlet of the cell counting slide and allowing the cleaning fluid to flow through the cell counting slide; and removing the cleaning fluid from the cleaning chamber and the cell counting slide via a cleaning fluid outlet in the base of the cleaning chamber by generating a vacuum configured to draw fluid through the cleaning fluid outlet.

16. The method according to claim 15, wherein feeding the cleaning fluid into the cleaning chamber comprises the cleaning fluid into the cleaning chamber for between 1 and 3 seconds and/or removing fluid from the cleaning chamber comprises removing fluid from the cleaning chamber and the cell counting slide simultaneously to discharging the cleaning fluid into the cleaning chamber.

17. The method according to claim 15, wherein a feeding the cleaning fluid into the cleaning chamber comprises feeding the cleaning fluid into the cleaning chamber between 1 and 30 times wherein each time is separated by a pre-determined interval, optionally wherein the pre-determined interval is between 0.5 and 3 seconds.

18. The method according to claim 17, wherein the method comprises removing fluid from the cleaning chamber during the pre-determined interval.

19. The method according to claim 15, wherein after feeding the cleaning fluid into the cleaning chamber, the method comprises drying the cell counting slide by removing the cleaning fluid from the cleaning chamber for between 0.5 and 30 seconds, optionally wherein drying the cell counting slide comprises using a positive pressure source to feed air into the cleaning fluid inlet for between 0.5 and 30 seconds.

* * * * *